United States Patent [19]

Ooi

[11] Patent Number: 4,794,033
[45] Date of Patent: Dec. 27, 1988

[54] OPTICAL JOINT COMPRISING ANTIREFLECTION FILMS

[75] Inventor: Yoshiharu Ooi, Shizuoka, Japan

[73] Assignee: Hamamatsu Photonics Kabushiki Kaisha, Shizouka, Japan

[21] Appl. No.: 909,029

[22] Filed: Sep. 17, 1986

[30] Foreign Application Priority Data

Oct. 2, 1985 [JP] Japan .................................. 219616

[51] Int. Cl.⁴ ......................... B32B 7/02; G02B 1/10
[52] U.S. Cl. .................................. 428/212; 350/1.6;
350/164; 427/162; 428/428; 428/432; 428/446;
428/689; 428/699; 428/701; 428/702
[58] Field of Search ............... 428/689, 699, 701, 702,
428/212, 428, 432, 446; 350/1.6, 164, 380;
427/162

[56] References Cited

U.S. PATENT DOCUMENTS

| 4,313,648 | 2/1982 | Yano et al. | 428/701 X |
| 4,532,174 | 7/1985 | Freller et al. | 428/701 X |
| 4,556,599 | 12/1985 | Sato et al. | 428/701 X |
| 4,581,280 | 4/1986 | Taguchi et al. | 428/701 X |
| 4,628,005 | 12/1986 | Ito et al. | 428/701 X |
| 4,637,939 | 1/1987 | Maruno et al. | 427/162 |
| 4,637,953 | 1/1987 | Sawamura et al. | 428/701 X |
| 4,640,867 | 2/1987 | Oyama et al. | 428/701 X |

OTHER PUBLICATIONS

Brochure entitled "Norland Optical Adhesives for Fast Precision Bonding," published by Norland Products, Inc., North Brunswick, N.J., no later than Feb. 1, 1980.

*Primary Examiner*—Ellis P. Robinson
*Assistant Examiner*—M. Katz
*Attorney, Agent, or Firm*—Finnegan, Henderson, Farabow, Garrett & Dunner

[57] ABSTRACT

An optical joint for joining a first light transmissive material to a second light transmissive material. The joint comprises a transparent adhesive layer between the first and second materials, and an antireflection film between each of the first and second materials and the adhesive layer. The joint prevents Fresnel reflection which would otherwise occur between the light transmissive materials.

7 Claims, 2 Drawing Sheets

OPTICAL JOINT COMPRISING ANTIREFLECTION FILMS

BACKGROUND OF THE INVENTION

This invention relates to a device for joining a plurality of light-transmitting optical materials.

In making an optical device by joining a plurality of light-transmissive optical materials, a transparent adhesive is conventionally used to join the optical materials together.

It is known in the art that, when a light beam strikes the interface between two substances of different refractive index, Fresnel reflection occurs at the interface.

In an optical device which, as shown in FIG. 9, uses one optical material having a refractive index $n_0$ joined to another optical material having a refractive index $n_1$, the Fresnel reflection factor R of a vertical incident light beam is as follows:

$$R = (n_1 - n_0)^2 / (n_1 + n_0)^2 \qquad (1)$$

Accordingly, if the refractive index $n_0$ of an adhesive used to join optical materials is different from that $n_1$ of the optical material, Fresnel reflection represented by equation (1) results with respect to incident light.

In general, light-transmissive dielectric crystals such as $LiNbO_3$, $LiTaO_3$, $TeO_2$ or $PbMoO_4$ have relatively large refractive indexes of greater than 2. On the other hand, the refractive index of commonly used transparent adhesives is about 1.5. Therefore, in the interface between the dielectric crystal and the transparent adhesive layer, Fresnel reflection of more than 2% is produced.

The intensity of the signal light in an optical device comprising a plurality of joined, light-transmissive optical materials is decreased when Fresnel reflection occurs. Furthermore, Fresnel reflected light interferes with light beams reflected from the other surfaces, resulting in unwanted interference fringes. As a result, Fresnel reflected light decreases the contrast of the signal light in an optical device.

Accordingly, it is an object of the present invention to provide an optical device comprising a plurality of light-transmissive optical materials joined together by means of transparent adhesive film layers, in which Fresnel reflection at the interface between adjacent optical materials is substantially prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in appended claims.

SUMMARY OF THE INVENTION

In accordance with the above objects there has been provided an optical joint for joining a first light-transmissive material to a second light-transmissive material, comprising: a transparent adhesive layer disposed between the first and second materials; a first antireflection film disposed between the adhesive layer and the first material; and a second antireflection film disposed between the adhesive layer and the second material. The first material has a refractive index $n_1$; the second material has a refractive index $n_3$; the adhesive has a refractive index $n_0$; and the second film has a refractive index between about $n_3$ and $n_0$.

The joint according to the invention is preferably adapted to transmit light of wavelength $\lambda$, and the first and seocnd films preferably have a thickness $\lambda/4$.

BRIEF DESRIPTION OF THE DRAWINGS

The accompanying drawings, which are incorporated in and constitute a part of the specification, illustrate a preferred embodiment of the invention and, together with the general description given above and the detailed description of the preferred embodiment given below, serve to explain the principles of the invention.

DETAILED DESCRIPTION OF THE PREFERRED EMBODIMENTS

Reference will now be made in detail to the present preferred embodiments of the invention as illustrated in the accompanying drawings.

Figure 1:
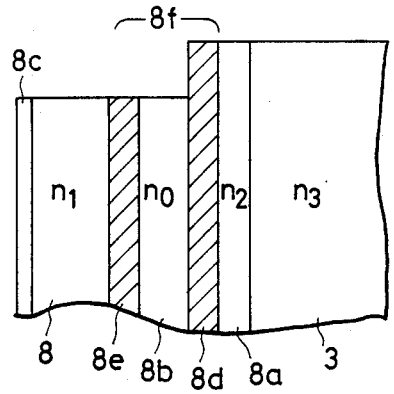
FIG. 1 is a sectional view showing a part of an embodiment of an optical device having a joint including antireflection films according to the present invention.

FIG. 1 is a sectional view showing one embodiment of an optical device having antireflection films according to the present invention. In FIG. 1, reference numeral 8 designates an electro-optic crystal. Reference numeral 8a designates a transparent electrode formed on a glass vacuum container 3.

In the embodiment of FIG. 1, the reflection which normally occurs when the electro-optic crystal 8 and the transparent electrode 8a are joined together directly with a transparent adhesive is prevented. According to the present invention, the electro-optic crystal 8 is joined to the transparent electrode 8a through a junction 8f comprising an antireflection film 8d on the side of the transparent electrode, a transparent adhesive 8b, and a antireflection film 8e on the side of the crystal.

Figure 2:
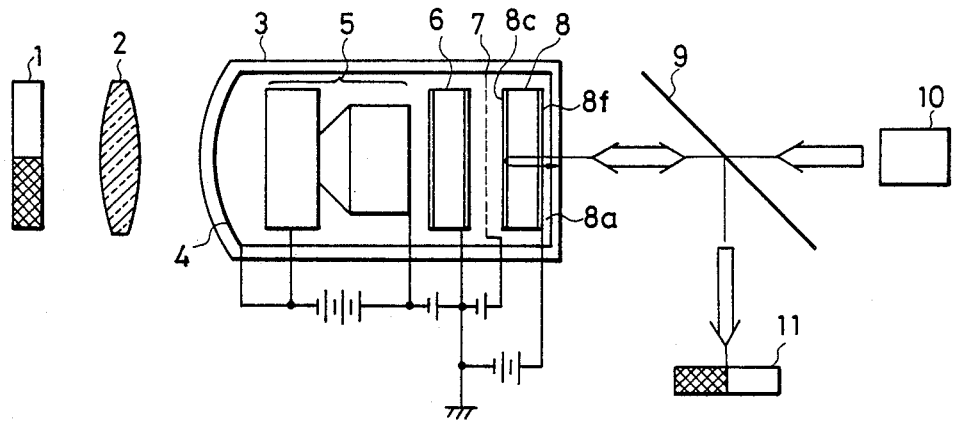
FIG. 2 is a sectional view showing the fundamental arrangement of a spatial light modulating tube including the optical joint according to the present invention.

FIG. 2 is a sectional view showing the general arrangement of a spatial light modulating tube incorporating an optical joint having antireflection films according to the present invention. The arrangement and operation of the spatial light modulating tube will be briefly described below.

As shown in FIG. 2, input pattern 1 is irradiated by an incoherent light beam, and its image is applied through lens 2 to photocathode 4 formed on the inner surface of the glass container 3 of the spatial light modulating tube. Photocathode 4 emits photoelectrons corresponding to the incident image. The photoelectrons are passed through an accelerating and focusing lens system 5 to a micro-channel plate 6, so that the number of photoelectrons is increased by a factor of several thousand. The resultant photoelectrons are accumulated on the surface of an electro-optic crystal 8 of $LiNbO_3$, or the like. Transparent electrode 8a is arranged on crystal 8 by means of a junction 8f (FIGS. 1 and 2), so that the refractive index of the crysal 8 is changed according to the electric charge image.

When a laser beam is applied from a laser beam source 10 through a half-mirror 9 to the electro-optic crystal 8, the (coherent) image of the laser beam is obtained. The image can be subjected to coherent parallel optical processing.

Instead of the laser beam source 10, a white lamp such as a halogen lamp can be employed to read the image data on the charge accumulating surface of the crystal.

In this case, an optical device according to this invention can be employed as a projector. Further, an electron gun can be employed as an electron source instead of the photocathode to write image data on the charge accumulating surface of the crystal.

As the thickness of the electro-optic crystal 8 for the spatial light modulating tube decreases, the spread, towards the crystal surface, of the lines of electric force formed in the crystal according to the accumulated charges is decreased and the spatial resolution is increased. Therefore, it is preferable that the thickness of crystal 8 is less than 100 μm.

Both surfaces of the thin crystal 8 are optically polished to a profile irregularity of higher than $\lambda/10$. In order to increase the reading laser beam intensity, a dielectric multi-layer film mirror 8c is formed on the electron storage surface of the crystal 8. The surface of the thin crystal 8 opposite to dielectric mirror 8c is joined to transparent electrode film 8a by means of junction 8f as shown in FIG. 1.

Figure 7:
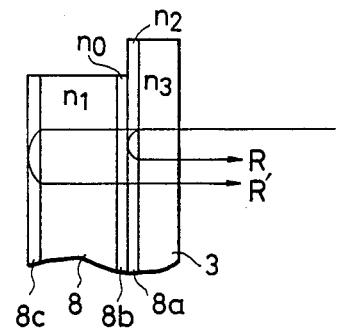
FIG. 7 is a sectional view showing the adhesive film layer of a conventional spatial light modulating tube.

FIG. 7 shows the adhesive layer of a conventional spatial light modulating tube. In the conventional spatial light modulating tube, one surface of thin crystal 8 has a dielectric multi-layer film mirror 8c formed on it similar to FIG. 2. The other surface of crystal 8 is joined to transparent electrode film 8a formed on a glass vacuum container 3 by means of a transparent adhesive layer 8b.

Figure 8:
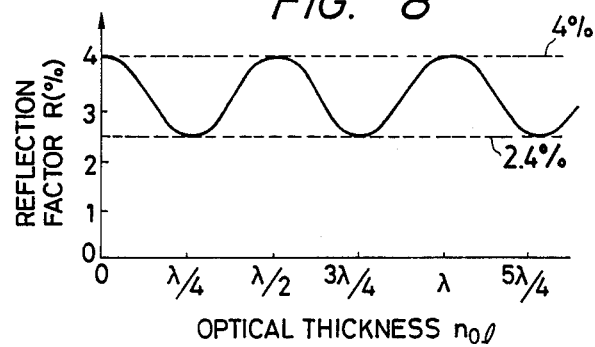
FIG. 8 is a graphical representation showing the dependency of the Fresnel reflection on the optical thickness of the adhesive film layer of the conventional spatial light modulating tube.

FIG. 8 is a graphical representation indicating the dependence of Fresnel reflection on the thickness of the adhesive layer in the conventional spatial light modulating tube.

The embodiment of the invention will be further described by referring to the above-described conventional spatial light modulating tube.

In a preferred embodiment of the present invention, the electro-optic crystal 8 is an $LiNbO_3$ crystal ($n_1 = 2.24$), the crystal bonding substrate is borosilicate glass ($n_3 = 1.49$), the transparent electrode 8a is of indium-tin oxide (ITO: $In_xSn_{(1-x)}O_3$) having $n_2 = 2.0$, and the adhesive layer 8b *is a transparent adhesive layer having a refractive index $n_0 = 1.56$*.

Furthermore, the reading laser beam has a wavelength $\lambda$, and the transparent electrode (or an ITO film) 8a has an optical thickness $\lambda/2$. First, the generation of a Fresnel reflection light beam in the conventional spatial light modulating tube (FIG. 7) in which no antireflection film is formed between the adhesive layer and the crystal will be described.

The Fresnel reflection fractor $R_1$ of the interface between the glass substrate 3 and the ITO film 8a, factor $R_2$ of the interface between the ITO film 8a and the adhesive layer 8b, and factor $R_3$ of the interface between the adhesive layer 8b and the $LiNbO_3$ crystal 8 can be represented by the following equations:

$$R_1 = (n_3-n_2)^2/(n_3+n_2)^2 = 2.1 \times 10^{-2} : 2.1\%$$

$$R_2 = (n_2-n_0)^2/(n_2+n_0)^2 = 1.5 \times 10^{-2} : 1.5\%$$

$$R_3 = (n_1-n_0)^2/(n_1+n_0)^2 = 3.2 \times 10^{-2} : 3.2\% \qquad (2)$$

Therefore, if the thickness of the adhesive layer is assumed to be l, then as a result of the interference of $R_1$, $R_2$ and $R_3$ the total reflection factor R can be approximately represented by the following equation (3):

$$\begin{aligned}
R &= |(R_1)^{\frac{1}{2}} - (R_2)^{\frac{1}{2}} + (R_3)^{\frac{1}{2}} \exp(i 4\pi n_0 \cdot l/\lambda)|^2 \\
&= [(R_1)^{\frac{1}{2}} - (R_2)^{\frac{1}{2}}]^2 + R_3 + 2[(R_1)^{\frac{1}{2}} - (R_2)^{\frac{1}{2}}](R_3)^{\frac{1}{2}} \cdot \cos(4\pi n_0 l/\lambda) \\
&= [3.2 + 0.8 \cos(4\pi n_0 l/\lambda)] \times 10^{-2}
\end{aligned} \qquad (3)$$

Accordingly, the reflection factor R changes with the optical thickness $n_0 l$ of the adhesive as shown in FIG. 8. That is, interference fringes indicatingthe nonuniform thickness of the adhesive layer are formed. Furthermore, the signal light having reflection factor R' which is reflected from the charge accumulating surface (8c in FIG. 7) of the $LiNbO_3$ crystal interferes with the reflected light having reflection factor R, thus forming more intricate interference fringes.

In order to eliminate such unwanted interference fringes and to increase the signal light intensity, antireflection films should be formed in the interface between the $LiNbO_3$ crystal and the adhesive layer and in the interface between the adhesive layer and the ITO layer, respectively.

In general, the antireflection condition for the interface between substances having refractive indexes $n_0$ and $n_3$ with respect to a wavelength $\lambda$ is to form a thin film having a refractive index $n = (n_0 \cdot n_3)^{\frac{1}{2}}$ and an optical thickness $\lambda/4$. This condition can also be applied to the case where a thin film having an optical thickness of $\lambda/2$ is formed in the interface between a substance having a refractive index $n_0$ and a substance having a refractive index $n_3$.

Therefore, the condition (A) for the antireflection film in the interface between the optical glass layer and the adhesive, and the condition (B) for the antireflection film in the interface between the adhesive layer and the $LiNbO_3$ crystal are as follows:

(A) Refractive index $n = (n_0 \cdot n_3)^{\frac{1}{2}} = 1.52$ Optical thickness $\lambda/4$ (B) Refractive index $n = (n_0 \cdot n_1)^{\frac{1}{2}} = 1.87$ Optical thickness $\lambda/4$ The condition (A) can also be applied to an embodiment of this invention as shown in FIG. 1 where an ITO film having an optical thickness of λ/2 is formed in the interface between the optical galss and the adhesive. In the embodiment shown in FIG. 1, antireflection film 8d satisfies condition (A), and antireflection film 8e meets condition (B). The antireflection film which satisfies the condition (A) can be obtained by vacuum-depositing SiO or $Al_2O_3$, and the reflection preventing film which satisfies the condition (B) can be obtained by vacuum-depositing $Gd_2O_3$ or $Y_2O_3$.

A light deflector utilizing an electro-optic effect, to which the above-described teachings of the present invention are applied, will be described with reference to FIGS. 3 and 4.

Figure 3:
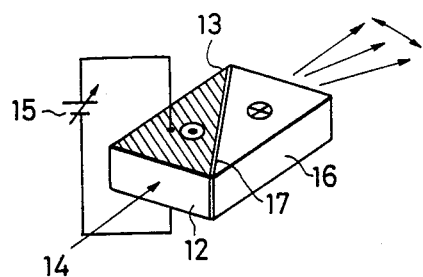
FIG. 3 is a perspective diagram showing the general arrangement of an electro-optic light deflector incorporating the teachings of the present invention.

As shown in FIG. 3, the light deflector has a prism 12, made of an optical material such as an $LiNbO_3$ crystal showing an electro-optic effect. When a voltage 15 is applied through electrode films 13 to the prism 12 in a direction perpendicular to the direction of advancement of the incident light 14, the refractive index of the crystal is changed, as a result of which the output light beam is deflected.

In order to compensate for the variation with temperature of the reflactive index of the prism, it is necessary to provide a prism 16 which is the same in material and configuration as the prism 12 and to join it to the prism 12 with adhesive 17 in such a manner that the optical axis of the prism 16 is opposite to that of the prism 12 as shown in FIG. 3.

Figure 4:
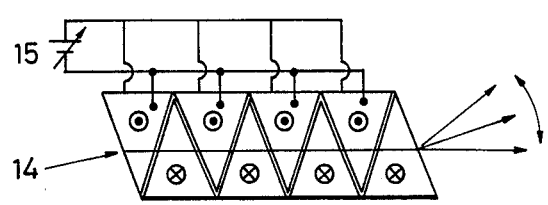
FIG. 4 is an explanatory diagram showing a multi-prism type electro-optic light deflector comprising a plurality of light deflectors shown in FIG. 3.

The deflection angle of the light beam can be increased by arranging a plurality of light deflectors (FIG. 3) as shown in FIG. 4; that is, the deflection angle can be increased by using a multi-prism type electro-optic light deflector.

In the light deflector, Fresnel reflection occurs in the interface between the prisms, where the adhesive layer is provided. As a result of the Fresnel reflection the signal light intensity is decreased and noise light is produced. However, these difficulties can be eliminated by forming the antireflection films similar to the embodiment of FIG. 1.

One example of a light deflector utilizing an acousto-optic effect, to which the above-described optical device of FIG. 1 is incorporated, will be described with reference to FIGS. 5 and 6. The acousto-optic light deflector is an optical device which utilizes the phenomenon that, when a sound wave propagates in an optical medium, owing to the acousto-optic effect the refractive index of the optical medium is changed in proportion to the acoustic distortion. As a result of the acousto-optic effect, and phase diffraction, a grating is formed and the light is diffracted. A general arrangement of the acousto-optic light deflector is shown in FIG. 5.

Figure 5:
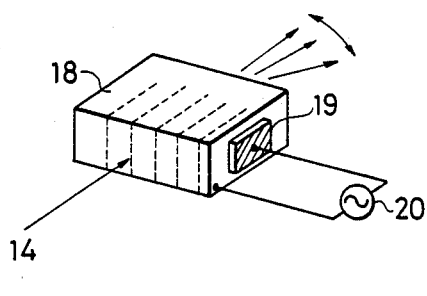
FIG. 5 is a perspective view showing the general arrangement of an acousto-optic light deflector incorporating the teachings of the present invention.
Figure 6:
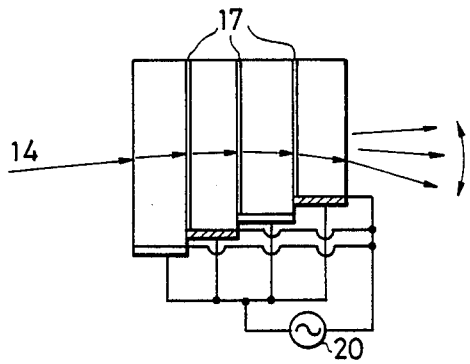
FIG. 6 is an explanatory diagram showing a deflector which comprises a plurality of acousto-optic light deflectors shown in FIG. 5.
Figure 9:
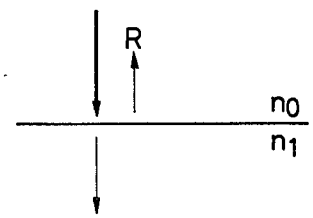
FIG. 9 is an explanatory diagram showing the Fresnel reflection light which is produced in the interface between substances of different refractive index.

In FIG. 5, reference numeral 18 designates an optical material having a photo-elastic effect. Reference numeral 19 represents a piezo-electric transducer. Numeral 20 represents a high frequency source. If a plurality of light deflectors are joined together through adhesive layers 17 as shown in FIG. 6, then the range of the deflection angle can be effectively icnreased. In this case, the transducers are arranged for delay, and the direction of advancement of the composite sound beam is changed with the exciting frequency.

In optical device according to FIG. 5, Fresnel reflection occurs in each interface where the adhesive layer 17 is formed, decreasing the signal light intensity, and producing noise light. However, as in the above-described embodiments, the difficulties can be eliminated by forming the antireflection films of FIG. 1 at the interfaces.

While a few embodiments of the invention have been described in detail, it is particularly understood that the invention is not limited thereto or thereby, and it is obvious to those skilled in the art that various changes and modifications may be made therein without departing from spirit or scope of the invention.

The antireflection film is used in an embodiment where an optical glass plate with an ITO film and an $LiNbO_3$ crystal are joined together by an adhesive layer. However, the antireflection film is similarly applicable to other light transmissive materials.

The above-described antireflection conditions are for a single wavelength λ. However, if a multi-layer film structure is employed in an antiflection then the antireflection film for a wide range of wavelengths can be formed.

Furthermore, SiO, $Al_2O_3$, $Gd_2O_3$ and $Y_2O_3$ have been disclosed as examples of a dielectric substance for forming the antireflection film. However, it should be noted that the components of the antireflection film are selected according to the refractive index of the light transmissive optical materials employed.

If two kinds of dielectric substances are mixed, then the antireflection film whose refractive index is between those of the dielectric substances can be formed.

As is described above, in an optical joint comprising a plurality of light-transmissive optical materials, the antireflection films of dielectric substances, according to the invention, are formed between the light-transmissive optical materials and the transparent adhesive layer. Therefore, the Fresnel reflection light which otherwise is produced in the interface between the adhesive layer and the optical material is eliminated. Accordingly, in the optical device provided according to the invention, no unwanted interference fringes are formed, and, therefore, the S/N ratio and the contrast ratio of an optical system incorporating the present invention are excellent.

Additional advantages and modifications will readily occur to those skilled in the art. The invention in its broader aspects is, therefore, not limited to the specific details, representative apparatus and illustrative examples shown and described. The scope of the invention is determined by the appended claims and their equivalents.

We claim:

1. An optical joint for joining a first light-transmissive material having a refractive index $n_1$, to a second light-transmissive material having a refractive index $n_3$, comprising:

a transparent adhesive layer, having a refractive index $n_0$, adapted to be disposed between the first and second materials;

a first antireflection film, having a refractive index between $n_1$ and $n_0$, disposed between said adhesive layer and the first material; and a second antireflection film, having a refractive index between $n_3$ and $n_0$, disposed between the adhesive layer and the second material, such that Fresnel reflection occurring at the interfaces between the adhesive layer and the first and second light-transmissive materials are substantially suppressed.

2. An optical joint according to claim 1, wherein said joint is adapted to transmit light of wavelength λ, and wherein said first and second layers have a thickness λ/4.

3. An optical joint according to claim 1, wherein said first film has a refractive index equal to about $(n_0.n_1)^{\frac{1}{2}}$, and wherein said second film has a refractive index equal to about $(n_0.n_3)^{\frac{1}{2}}$.

4. An optical joint according to claim 1, wherein one of said first and second materials comprises a material whose refractive index changes when voltage is applied thereto.

5. An optical joint according to claim 1, wherein one of said first and second materials comprises a material whose refractive index changes when mechanical stress is applied thereto.

6. An optical joint according to claim 1, wherin said first and second films comprise a material selected from the group consisting of:

SiO, $Al_2O_3$, $Gd_2O_3$ and $Y_2O_3$.

7. An optical joint according to claim 1, wherein said first material comprises $LiNbO_3$, and wherein said second material comprises indium-tin oxide.

* * * * *